3,445,437
PROCESS FOR THE PREPARATION OF HIGH MOLECULAR WEIGHT POLYNITROETHYLENE

Murray H. Reich, Princeton, N.J., and Aaron Rothwachs, Bronx, N.Y., assignors to Commercial Solvents Corporation, New York, N.Y., a corporation of Maryland
No Drawing. Filed July 21, 1966, Ser. No. 566,747
Int. Cl. C08f 3/88, 1/28
U.S. Cl. 260—80                 5 Claims

ABSTRACT OF THE DISCLOSURE

High molecular weight nitroethylene homopolymer which have an inherent viscosity of not less than 0.8. The high molecular weight nitroethylene homopolymers are useful in preparing self-supporting films. A method for preparing high molecular weight nitroethylene homopolymers which consists of polymerizing nitroethylene in the presence of an aryl lithium or alkyl lithium catalyst. The preparation is carried out in a liquid polymerization medium at a temperature of from about −120° to about +20° C.

---

This invention relates to novel nitroethylene homopolymers. In a particular aspect this invention relates to high molecular weight, nitroethylene homopolymers and to a method for their preparation.

It is known that nitroethylene can be polymerized in solution in the presence of basic catalysts such as alkali and alkaline earth metal carbonates and bicarbonates and sodium cyanide to yield low molecular weight homopolymers of nitroethylene.

Nitroethylene homopolymers produced by the above-described procedures may be cast as films from solution. Unfortunately, such films are undesirably weak and brittle thus making them generally unsuitable when used as self-supporting films. The generally poor properties of such films are believed to be primarily due to the low molecular weight of the homopolymers.

It is an object of the present invention to provide novel nitroethylene homopolymers.

It is another object of the present invention to provide novel high molecular weight nitroethylene homopolymers which can be formed into self-supporting films having satisfactory toughness and flexibility properties.

Still another object of the present invention is the provision of a method for the preparation of high molecular weight nitroethylene homopolymers.

Other objects and advantages of the present invention will be apparent from the specification and appended claims.

The high molecular weight nitroethylene homopolymers of the present invention are defined as nitroethylene homopolymers having a minimum inherent viscosity of 0.8, said inherent viscosity being measured at 30° C. on a 0.2% solution of said homopolymer in N,N′-dimethylformamide. In contrast, the low molecular weight nitroethylene homopolymers of the prior art have a maximum inherent viscosity of about 0.4 when measured as described. The formula for inherent viscosity is that described by L. H. Cragg in Journal of Colloid Science 1, 261–9 (May 1946) and is expressed as follows:

$$\text{Inherent viscosity} = \frac{\ln \text{relative viscosity}}{C}$$

where, relative viscosity=ratio of solution viscosity to solvent viscosity, and C=concentration of solute in solution (grams of polymer/100 ml. solution).

The preparation of the high molecular weight homopolymers of the present invention is carried out by contacting nitroethylene monomer with a catalyst selected from the group consisting of aryl lithium and alkyl lithium in a liquid solvent polymerization medium at a temperature in the range of from about −120° C. to about +20° C. for a time sufficient to permit the homopolymer to form.

The nitroethylene monomer starting materials may be prepared by any suitable procedure. The preparation of nitroethylene monomer has been described in the literature (see, for example, Journal of the Chemical Society, 1477 (1947) and application Ser. No. 434,697 filed Feb. 23, 1965, for R. L. Abbot).

Any suitable aryl lithium or alkyl lithium catalyst may be used in the present invention. Such suitable catalysts include phenyl lithium, n-butyl lithium, sec.-butyl lithium, n-hexyl lithium, n-amyl lithium and the like. Because of its ready availability and the excellent results obtained therewith, n-butyl lithium is the preferred catalyst. The aryl lithium or alkyl lithium catalyst should be present in the polymerization medium in an amount in the range of from about 0.002 to about 0.15% by weight, based on the weight of the nitroethylene monomer. Preferably, amounts between about 0.01 and about 0.05% by weight should be used.

As previously pointed out the polymerization is conducted at a temperature in the range of from about −120° C. to about +20° C. Temperatures above +20° C. should be avoided since the molecular weight of the nitroethylene homopolymers produced at such temperatures are low. Temperatures below −120° C. should be avoided since at such temperatures the rate of polymerization is exceedingly slow. As a compromise between a suitable rate of polymerization and the production of nitroethylene polymers of highest molecular weight temperatures in the range of from about −80° to about −50° C. are preferred.

Any suitable solvent for the nitroethylene monomer starting material which is liquid at below +20° C. and which does not interfere with polymerization may be used as the polymerization solvent in the present invention. Examples of such solvents are non-aqueous polar solvents such as N,N′-dimethylformamide, tetrahydrofuran, dimethylsulfoxide, dimethylacetamide, etc., and mixtures thereof. Because of the excellent results obtained therewith mixtures of N,N-dimethylformamide and tetrahydrofuran are preferred.

The polymerization medium is preferably anhydrous or substantially anhydrous. Small amounts of moisture such as may be present in the nitroethylene monomer or may be introduced by contact with atmospheric air will not prevent polymerization but should be avoided for best results.

Upon completion of the polymerization reaction, it is desirable to neutralize the activity of the polymerization catalyst to avoid degradation of the polymer. Neutralization of the catalyst is readily accomplished by addition of an acid, such as hydrochloric acid, to the polymerization medium in at least a stoichiometric amount of the active catalyst. When polymerization ceases the nitroethylene homopolymer may be isolated from the polymerization solvent medium by any suitable means as for example by filtration or by evaporation of the polymerization solvent.

The high molecular weight nitroethylene homopolymers of the present invention may be cast from solution as self-supporting film for packagings and wrappings. For many applications it may be desirable to incorporate additives such as plasticizers, stabilizers, pigments, fillers, antioxidants, etc., in the homopolymers before fabrication of the homopolymers into useful articles. Selection of suitable additives will be obvious to the skilled worker.

The high molecular weight nitroethylene homopolymers of the present invention are copolymerizable with a wide variety of polymerizable monomers such as vinylidine chloride, acrylonitrile, formaldehyde, vinyl esters of aliphatic acids, for example vinyl acetate, alkyl esters of mono-olefinic acids for example dialkyl fumarate and maleate, vinyl halides, for example vinyl chloride, etc., and the like.

The invention will be understood more fully by reference to the following specific examples. It is understood that the examples are presented for purposes of illustration only and are not intended as a limitation of the invention.

Example 1

To a polymerization vessel was charged a solution prepared by adding 4.2 grams of nitroethylene monomer to 100 ml. of a mixture consisting of 50 ml. of N,N-dimethylformamide and 50 ml. of tetrahydrofuran. The solution was then cooled to −70° C. To the cooled solution was then added a solution prepared by mixing 1 ml. of a 21.5% solution of n-butyl lithium in heptane with 19 ml. of tetrahydrofuran. The polymerization medium was maintained at −70° C. for 75 minutes with accompanying agitation. The catalyst was then neutralized by the addition of a dilute solution of hydrochloric acid in methanol and the medium was allowed to warm to room temperature. The polymer was then filtered off, washed with methanol and dissolved in N,N-dimethylformamide. The polymer was precipitated from the resulting solution by addition to the solution of a dilute solution of hydrochloric acid in methanol, then filtered and dried. Nitroethylene homopolymer was obtained (59.0% conversion based on nitroethylene monomer). The polymer had an inherent viscosity of 1.09 when measured in 0.2% solution in N,N-dimethylformamide at 30° C.

The polymer product was dissolved in N,N-dimethylformamide and cast as a film on a glass plate. A clear, tough, flexible film was obtained.

Example 2

A high molecular weight nitroethylene homopolymer having an inherent viscosity greater than 0.8 is prepared by essentially the same procedure used in Example 1 except that there is used a polymerization temperature of −50° C. and as catalyst sec.-butyl lithium.

Example 3

A high molecular weight nitroethylene homopolymer having an inherent viscosity greater than 0.8 is prepared by essentially the same procedure used in Example 1 except that there is used a polymerization temperature of −80° C. and as catalyst phenyl lithium.

Since many embodiments may be made in this invention and since many changes may be made in the embodiments described, the foregoing is to be interpreted as illustrative only, and the invention is defined by the claims appended hereto.

We claim:

1. A method of preparing high molecular weight nitroethylene homopolymers under substantially anhydrous conditions which comprises polymerizing nitroethylene in a liquid polymerization medium at a temperature of from about −120° to about +20° C. in the presence of from about 0.002 to about 0.15% by weight based on the weight of the nitroethylene of a polymerization catalyst selected from the group consisting of aryl lithium and alkyl lithium.

2. The method of claim 1 wherein the temperature is in the range of from about −80° to about −50° C.

3. The method of claim 1 wherein the amount of polymerization catalyst is in the range of from about 0.01 to about 0.05% by weight.

4. The method of claim 3 wherein the catalyst is N-butyl lithium.

5. The method of claim 1 wherein the liquid polymerization medium comprises a mixture of N,N-dimethylformamide and tetrahydrofuran.

References Cited

UNITED STATES PATENTS

| | | | |
|---|---|---|---|
| 2,384,049 | 9/1945 | Smith et al. | 260—644 |
| 2,385,037 | 9/1945 | Smith et al. | 260—644 |
| 3,078,254 | 2/1963 | Zelinski et al. | 260—45.5 |
| 3,157,604 | 11/1964 | Strobel | 252—431 |

OTHER REFERENCES

Vofsi, D.: J. Polymer Science, 26, pp. 134–135 (1957).
Perkalin, V. V.: Unsaturated Nitro Compounds, Davey and Co., New York, 1964, p. 320.
Vofsi, D.: J. Polymer Science, 26, pp. 137–139 (1957).

JOSEPH L. SCHOFER, *Primary Examiner.*

C. A. HENDERSON, JR., *Assistant Examiner.*

U.S. Cl. X.R.

260—644, 875, 881, 884, 885